United States Patent [19]
Sprague et al.

[11] 3,771,497
[45] Nov. 13, 1973

[54] VAPOR GENERATOR CONTROL

[75] Inventors: Theodore S. Sprague, Hudson; John Schlicting, Akron, both of Ohio; Bertrand N. McDonald, Lynchburg, Va.

[73] Assignee: The Babcock & Wilcox Company, New York, N.Y.

[22] Filed: Apr. 26, 1972

[21] Appl. No.: 247,543

[52] U.S. Cl. .................................. 122/32, 122/7
[51] Int. Cl. ............................................. F22b 1/02
[58] Field of Search ................... 122/32, 33, 34, 7 R

[56] References Cited
UNITED STATES PATENTS

| | | | |
|---|---|---|---|
| 3,070,536 | 12/1962 | Taylor et al. | 122/32 X |
| 3,007,456 | 11/1961 | Murray et al. | 122/33 |
| 3,030,779 | 4/1962 | Hryniszak et al. | 122/33 X |

*Primary Examiner*—Kenneth W. Sprague
*Attorney*—J. Maguire

[57] ABSTRACT

A vapor generating system comprising a pressure vessel wherein secondary liquid is vaporized through indirect heat exchange with a hot primary fluid and including a control arrangement whereby thermal shock stresses in the vessel are limited by controlled preheating of secondary liquid being fed thereto.

10 Claims, 2 Drawing Figures

PATENTED NOV 13 1973 3,771,497

VAPOR GENERATOR CONTROL

BACKGROUND OF THE INVENTION

This invention relates in general to the control of vapor generators, and more particularly to a control arrangement for limiting the thermal shock stresses in the vapor generator pressure vessel by controlled preheating of secondary liquid fed into the vessel for vaporization therein by heat extracted from a hot primary fluid.

The instant invention has particularly advantageous use in connection with nuclear powered vapor generators. In many known nuclear powered vapor generators, heat is extracted from the reactor core by a primary fluid passed therethrough and circulated in a closed cycle through tubes transiting a pressure vessel. The heat extracted from the core is released to vaporize secondary liquid that is fed into the vessel in physically separated heat exchange with the primary fluid.

One of the problems encountered in the prior art is that of maintaining structural integrity of the pressure vessel against thermal shocks thereto occasioned by the introduction into the vessel of excessively cold secondary liquid. Under various operating conditions, the primary fluid temperature may be relatively high compared to the incoming secondary fluid temperature, and where the primary fluid flows through tubes received in a tubesheet that is also exposed to incoming secondary liquid, severe thermal shock stresses to the tubesheet may result. It is therefore important that the temperature differential between the secondary liquid feed to the vessel and the primary fluid leaving the vessel be held within a prescribed safe limit.

SUMMARY OF THE INVENTION

According to the invention, thermal shocks to the vessel are reduced in severity by supplementary preheating of the secondary liquid outside the vapor generator pressure vessel. The preheat temperature of the secondary liquid is automatically controlled by regulating means comprising a heat exchanger and control apparatus located outside the pressure vessel. The heat exchanger is disposed to receive a heat input from the appropriate one of a plurality of heat sources for heating the secondary liquid entering the vessel and the control apparatus includes series flow connected first and second valves interposed between the heat exchanger and the heat sources. The first valve being operable to select the heat source capable of supplying the heat exchanger with a heat input capable of raising the temperature of the secondary liquid entering the vessel to a required value and the second valve being operable to vary the quantity of selected heat input to the heat exchanger to maintain this required temperature value.

In the main embodiment of the invention, the control apparatus includes means for determining the temperature of the secondary liquid at the inlet to the vessel and comprises pressure sensing means for transmitting the pressure of heating fluid from within the heat exchanger to a controller which in turn positions a flow control valve for regulating the quantity of heating fluid being admitted to the heat exchanger.

An alternate embodiment of the invention includes means for determining the temperatures of the primary fluid at the outlet of the vessel and the secondary liquid at the inlet to the vessel, respectively. The temperature determining means include a first transducer disposed to sense the primary fluid temperature at the outlet of the vessel and establish a signal representative thereof and a second transducer disposed to sense the secondary liquid temperature at the inlet to the vessel and establish a signal representative thereof. The two temperature signals are transmitted to a controller which emits an output signal equivalent to the difference between the two input signals. The output signal is transmitted to a flow control valve for regulating the quantity of heating fluid being admitted to the heat exchanger.

In both the main and alternate embodiments of the invention, the control apparatus includes means for determining the available heat input and comprises pressure sensing means for transmitting the pressure of heating fluid from within one of the heat sources, normally designated as the primary heat source, to a controller which in turn positions a fluid selector valve to admit fluid from the appropriate one of the heating sources. The selector valve is controlled in accordance to a predetermined heating fluid pressure value and is normally positioned to admit fluid from the primary heat source, however, if fluid within the primary source drops below the predetermined value, the selector valve is repositioned to admit fluid from an auxiliary heat source.

The fluid selector and control valves are regulated to maintain the heating fluid pressure within the heat exchanger at a value which has a saturation temperature substantially equal to the required secondary liquid temperature at the inlet to the vessel thereby maintaining the temperature difference, between the entering secondary liquid and the primary fluid leaving the vessel, within a given limit.

DESCRIPTION OF PREFERRED EMBODIMENTS OF THE INVENTION

Figure 1:
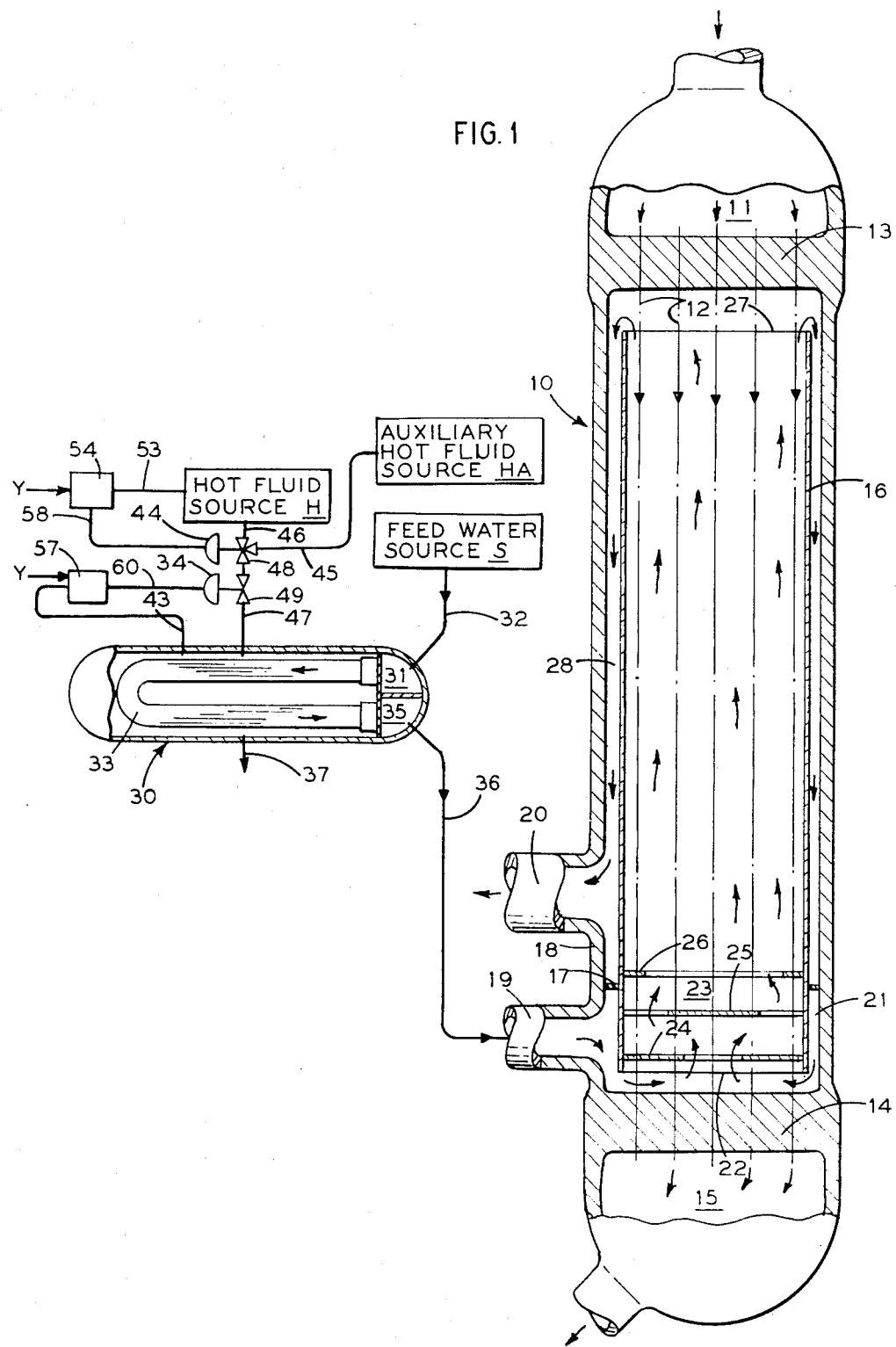
FIG. 1 is a sectional side elevation of the vapor generating vessel and the heat exchanger and includes a schematic showing of various components associated with the main embodiment of the invention.

In FIG. 1 of the drawing there is shown a vapor generator control arrangement in which a hot primary fluid such as the coolant from a nuclear reactor core (not shown), is passed through a generally upright pressure vessel 10 and therein undergoes physically separated heat exchange with a secondary liquid, such as water, fed into vessel 10. Primary fluid enters into a plenum chamber 11 at one end of vessel 10 and passes through tubes 12 (shown in centerline layout only) received in tubesheets 13 and 14, collects in a plenum chamber 15 at the opposite end of vessel 10 wherefrom it exits for recirculation.

Within vessel 10 there is a shroud 16 surrounding the bundle of tubes 12 and open at both ends. A ring plate 17 connected at its inner edge to shroud 16 and at its outer edge to the wall 18 of vessel 10 serves to separate incoming feedwater introduced through a nozzle 19 from outgoing vapor exiting through another nozzle 20.

Feedwater entering through nozzle 19 is constrained by plate 17 to flow downward in the annular space 21 between wall 18 and shroud 16, and thence into the open lower end 22 of shroud 16, sweeping across the tubesheet 14. The lower interior portion of shroud 16 is designed to serve as an integrally contained economizer chamber 23, and for such purpose there are provided baffles 24, 25, 26 that increase the residence time of the feedwater in chamber 23. The feedwater is heated and vaporized by heat transfer through tubes 12 from the primary fluid. The vapor thus produced, which can be either saturated or superheated depending upon the amount of heating provided by tubes 12, passes out the open upper end 27 of shroud 16 and flows down the annular passage 28, between shroud 16 and wall 18 and above ring 17, for exit through nozzle 20.

The primary fluid flowing through tubes 12 is at a considerably higher temperature, as much as several hundred degrees higher than the feedwater supply temperature, such that, if the feedwater from the source S were to be introduced directly into vessel 10, severe thermal shock stresses would occur because the relatively cold feedwater would chill the side of tubesheet 14 adjacent the shroud end 22 whereas the other side of tubesheet 14 would be heated by the primary fluid in plenum 15.

To avoid such thermal shock stresses and the problems they create, the invention proposes to preheat the feedwater before entry into vessel 10 such that the difference, between the temperature of the incoming feedwater flowing through nozzle 19 and the temperature of the primary fluid in plenum 15, is maintained within a given limit.

In accordance with the present invention, feedwater source S is flow connected with nozzle 19 through a heat exchanger 30 that effects preheating of the feedwater for the purpose of maintaining the specified limit in temperature difference between the feedwater entering the vessel and the primary fluid leaving the vessel.

Heat exchanger 30 is expediently a shell and tube type heat exchanger, and has an inlet plenum 31 flow connected by a conduit 32 to the source S for receiving partially-heated or cold water therefrom. The feedwater is conveyed from the plenum 31 through a bundle of U-bent tubes 33 wherein it is heated by indirect heat exchange with a hot fluid flowing through the shell side of heat exchanger 30. The preheated feedwater exiting from the tubes 33 is collected in an outlet plenum 35 and thereafter delivered to nozzle 19 through a conduit 36 flow connected therewith.

The heating or hot fluid is shown generally as being supplied to heat exchange 30 from either a source H or an auxiliary source HA. The hot fluid from source H is conveyed through a conduit 46 to one of two inlets of the selector valve 48, while the hot fluid from auxiliary source HA is conveyed through a conduit 45 to the other inlet of the selector valve 48. The selected hot fluid is thereafter conveyed into the shell side of heat exchanger 30 through a conduit 47 which includes a control valve 49 for regulating the quantity of hot fluid being admitted into heat exchanger 30. The spent hot fluid is discharged from heat exchanger 30 through a drain line 37. It will be understood that there may be more than one auxiliary heat source associated with the heat exchanger 30.

In the main embodiment of the invention, the selector and control valves 48 and 49 are actuated by controllers 54 and 57, respectively. The controller 54 is arranged to respond to a signal representing the pressure of hot fluid from within the primary heat source H; this signal being applied via transmission line 53 which interconnects the primary heat source H with the input side of controller 54. The controller 54 generates a control or output signal that is applied to the selector valve 48 via transmission line 58 which interconnects the output side of controller 54 to the actuating device 44 associated with the valve 48. The controller 57 is arranged to respond to the pressure of hot fluid from within the heat exchanger 30; this pressure being applied via transmission line 43 which interconnects heat exchanger 30 with the input side of controller 57. The control or output signal from controller 57 is applied to the flow control valve 49 via transmission line 60 which interconnects the output side of controller 57 to the actuating device 34 associated with the valve 49.

The choice and details of the actual components used to control and actuate the valves 48 and 49 are left to the artisan, since there are many known components that can be used. For example, the controllers 54 and 57 may be of the type that include a set point represented schematically by arrow Y which provides the means for selecting the hot fluid pressure required to heat the entering feedwater to the desired temperature. The actuators 34 and 44 can be pressure responsive spring and diaphragm operated mechanisms.

Figure 2:
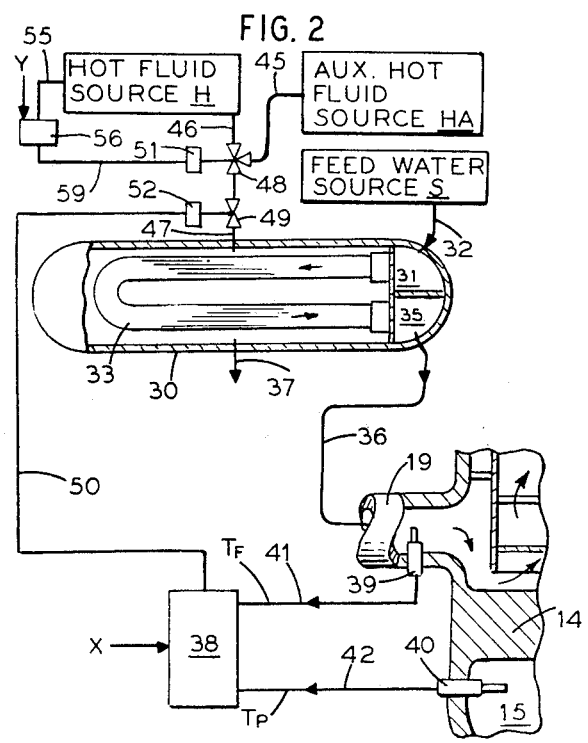
FIG. 2 is a sectional side elevation of the heat exchanger and includes a schematic showing of various components associated with an alternate embodiment of the invention.

In the alternate embodiment of the invention as shown in FIG. 2, there is provided a transducer 39 disposed to sense the temperature of the feedwater entering vessel 10, and a transducer 40 disposed to sense the temperature of the primary fluid leaving vessel 10. Each of the transducers 39 and 40 establishes a signal representing the temperature which it senses. The feedwater temperature signal $T_F$ and the primary fluid temperature signal $T_P$ are applied to a controller 38 via transmission lines 41 and 42 from transducers 39 and 40, respectively. The controller 38 generates an output signal that is applied to the flow control valve 49 via transmission line 50 which interconnects the output side of controller 38 to the actuating device 52 associated with the valve 49. The controller 56 is arranged to respond to a signal representing the pressure of hot fluid from within the primary heat source H; the signal being applied via transmission line 55 which interconnects the primary heat source H with the input side of controller 56. The controller 56 generates a control or output signal that is applied to the selector valve 48 via transmission line 59 which interconnects the output side of controller 56 to the actuating device 51 associated with the valve 48.

The choice and details of the actual components used to control and actuate the valves 48 and 49 are left to the artisan, since there are many known components that can be used. For example, the controllers 38 and 56 may be of the type that include a set point represented schematically by arrows X and Y, respectively. Set point X provides the means for selecting the desired $(T_P-T_F)$ limit which in turn regulates the hot fluid pressure within the heat exchanger 30. Set point Y provides the means for selecting the hot fluid pressure required for heating the entering feedwater to the desired temperature. The actuators 51 and 52 can be electrically responsive devices mechanically linked to or integrated with the respective valves 48 and 49.

The materials used in the fabrication of the vapor generator, particularly, the lower tubesheet, will determine the limit on feedwater-to-primary fluid temperature required throughout the entire operating range of the unit. For example, it has been found that cladding the lower tubesheet with Inconel will allow a steeper temperature gradient across the thickness of the tubesheet without injurious effect to the metal.

In the operation of the invention, the temperature of the feedwater entering vessel 10 is maintained at a value or values which were predetermined as satisfying the feedwater-to-primary fluid differential temperature limit prescribed for the steam generator throughout the entire load range. A power plant cycle is normally designed wherein the feedwater entering the steam generating vessel is within a few Fahrenheit degrees of the saturation temperature of the heating fluid passing through the highest stage heater, which is represented in our preferred embodiments as heat exchanger 30.

Accordingly, in both embodiments of the invention, the feedwater temperature entering the vessel 10 is being maintained at the predetermined value by regulating the hot fluid pressure within the heat exchanger 30 to keep a pressure having a saturation temperature corresponding to the predetermined feedwater temperature. The hot fluid may be obtained from any number of heat sources, for example, the primary source H may be steam from an extraction point on the high pressure turbine (not shown) while the auxiliary source HA is steam from the outlet of the vapor generator.

In the main embodiment of the invention, the hot fluid saturation pressure required for maintaining the desired feedwater temperature is regulated through the controller 54 which senses the available hot fluid pressure from the primary heat source H, and the controller 57 which senses the working hot fluid pressure within the heat exchanger 30. Both controllers are equipped with adjustable set points Y which provide the means for selecting the hot fluid pressure required to heat the entering feedwater to the desired temperature. The controller 54 compares the amplitude of the input signal from the primary heat source H with the amplitude of the set point signal Y representing the selected pressure and, whenever, the input signal is smaller than the signal of set point Y, an output signal is transmitted from controller 54 to the actuator 44 which then positions the valve 48 to admit steam from the auxiliary heat source HA. The controller 57 compares the amplitude of the input signal from heat exchanger 30 with the amplitude of the set point signal Y representing the selected pressure and, whenever, there is a difference between the input and set point signals, an output signal is transmitted from controller 57 to the actuator 34 which adjusts the control valve 49 to increase or decrease the flow of hot fluid to the heat exchanger 30, as required.

In the alternate embodiment of the invention, the hot fluid saturation pressure required for maintaining the desired feedwater temperature is regulated through the controller 56 which senses the available hot fluid pressure from the primary heat source H, and the controller 38 which senses the temperature of the feedwater entering vessel 10 and the temperature of the primary fluid leaving vessel 10. The controllers 56 and 38 are equipped with adjustable set points Y and X which provide the means for selecting the hot fluid pressure required to heat the entering feedwater to the desired temperature. The controller 56 compares the amplitude of the input signal from the primary heat source H with the amplitude of the set point signal Y representing the selected pressure and, whenever, the input signal is smaller than the signal of set point Y, an output signal is transmitted from the controller 56 to the actuator 51 which then positions the valve 48 to admit steam from the auxiliary source HA. The controller 38 resolves the primary fluid and secondary fluid input signals into a signal representative of the temperature difference therebetween and compares the latter signal with the signal of set point X and whenever a difference exists between the set point and resolved signals, an output signal is transmitted from controller 38 to the actuator 52 which adjusts the control valve 49 to increase or decrease the flow of hot fluid to the heat exchanger 30, as required.

While in accordance with provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

We claim:

1. A vapor generating system having a pressure vessel, a primary fluid and a secondary liquid flowing in physically separated heat exchange through said vessel wherein heat extracted from the primary fluid is used to vaporize the secondary liquid, the improvement comprising means for regulating the temperature of the secondary liquid entering the vessel including a heat exchanger and a plurality of hot fluid sources located outside the vessel, the heat exchanger being disposed to receive hot fluid from a selected one of said sources for heating the secondary liquid entering the vessel, control apparatus for selecting said source and adjusting the hot fluid input rate to the heat exchanger to correspondingly adjust the temperature of the secondary liquid entering the vessel thereby maintaining the temperature difference between the entering secondary liquid and the primary fluid leaving the vessel within a given limit.

2. The method of operating a vapor generating system including a pressure vessel, a primary fluid and a secondary liquid flowing in physically separated heat exchange through said vessel wherein heat extracted from the primary fluid is used to vaporize the secondary liquid, a heat exchanger and a plurality of hot fluid sources located outside the vessel, the heat exchanger being disposed to receive hot fluid from a selected one of said sources for heating the secondary liquid entering the vessel, and comprising the steps of:

sensing the hot fluid pressure in at least one of said sources, selecting the source in accordance with said sensed pressure, determining the temperature of the secondary liquid in at least one given location, and varying the hot fluid input rate to the heat exchanger in accordance with said determined temperature to maintain the temperature difference between the entering secondary liquid and the primary fluid leaving the vessel within a given limit.

3. The improvement according to claim 1 wherein the control apparatus includes serially disposed first and second valves intermediate of and in flow communication with said hot fluid sources and heat exchanger, the first valve being operable for selecting the source and the second valve being operable for varying the rate of hot fluid being admitted into the heat exchanger, the first valve being upstream fluid flow-wise of said second valve.

4. The improvement according to claim 1 wherein the control apparatus includes separate means for determining the hot fluid pressure and the secondary liquid temperature in at least one given location.

5. The improvement according to claim 3 wherein the means for determining the hot fluid pressure includes pressure sensing means operatively associated with at least one of said sources.

6. The improvement according to claim 4 wherein the means for determining the secondary liquid temperature includes pressure sensing means operatively associated with said heat exchanger.

7. The improvement according to claim 4 wherein the means for determining the secondary liquid temperature includes a transducer disposed to sense the temperature of the secondary liquid entering the vessel and establish a signal representative thereof.

8. The improvement according to claim 4 including means for determining the temperature of the primary fluid in at least one given location.

9. The improvement according to claim 8 wherein the means for determining the primary fluid temperature includes a transducer disposed to sense the temperature of the primary fluid exiting the vessel and establish a signal representative thereof.

10. The improvement according to claim 2 including the steps of determining the temperature of the primary fluid in at least one given location and varying the hot fluid input rate to the heat exchanger in accordance with said determined primary fluid temperature.

* * * * *